US007174546B2

(12) United States Patent
Koseki et al.

(10) Patent No.: US 7,174,546 B2
(45) Date of Patent: Feb. 6, 2007

(54) COMPILER AND REGISTER ALLOCATION METHOD

(75) Inventors: Akira Koseki, Sagamihara (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 09/950,904

(22) Filed: Sep. 12, 2001

(65) Prior Publication Data

US 2002/0095668 A1    Jul. 18, 2002

(30) Foreign Application Priority Data

Sep. 12, 2000    (JP)    ............... 2000-276203

(51) Int. Cl.
*G06F 9/45*    (2006.01)
(52) U.S. Cl. ............... 717/157; 717/154; 717/149; 717/151; 717/155; 717/156
(58) Field of Classification Search .............. 717/155, 717/156, 153, 141
See application file for complete search history.

(56) References Cited

U.S. PATENT DOCUMENTS

| 4,782,444 | A | * | 11/1988 | Munshi et al. ............ 717/153 |
| 5,920,716 | A | * | 7/1999 | Johnson et al. ........... 717/141 |
| 6,077,313 | A | * | 6/2000 | Ruf .......................... 717/155 |
| 6,260,190 | B1 | * | 7/2001 | Ju ............................ 717/156 |

OTHER PUBLICATIONS

Koseki et al., A Register Allocation Technique Using Register Existence Graph, IEEE, 1997.*
Koseki et al., A Register Allocation Technique Using Guarded PDG, ACM, 1996.*
Norris et al., The Design and Implementation of RAP: A PDG-based Register Allocator, John Willey & Sons, 1998.*
Proebsting et al., Probabilistic Register Allocation, ACM, 1992.*
Traub et al., Quality and Speed in Linear-scan Register Allocation, ACM, 1998.*
Kreahling et al., Profile Assisted Register Allocation, ACM, 2000.*
Kurlander et al., Minimum Cost Interprocedural Register Allocation, ACM, 1996.*
Kim et al., Unroll-Based Register Coalescing, ACM, 2000.*
Makowski et al., Achieving Efficient Register Allocation Via Parallelism, ACM, 1995.*
Callahan et al., Register Allocation via Hierarchical Graph Coloring, ACM, 1991.*
Ferrante et al., The Program Dependence Graph and its Use in Optimization, ACM, 1987.*
Norris et al., "Register allocation sensitive region scheduling," 1995.*

* cited by examiner

*Primary Examiner*—Kakali Chaki
*Assistant Examiner*—Insun Kang
(74) *Attorney, Agent, or Firm*—Douglas W. Cameron; Anne Vachon Dougherty

(57) ABSTRACT

A computer, computer compiler and method for reducing the number of interferences between variables during graph coloring while maintaining the possibility that the instructions will be executed in parallel. A compiler, which converts into a machine language the source code of a program written in a programming language and optimizes the program includes: a directed acyclic graph DAG analysis unit 11 for constructing and analyzing a DAG for an instruction in a program to be processed; an interference graph construction unit 12 for employing the analysis results to construct an interference graph representing the probability that an interference will occur between variables used by the instructions; and a graph coloring unit 13 for allocating registers for the instruction based on the interference graph that is constructed.

13 Claims, 16 Drawing Sheets

(a) Life span table  (b) Interference graph (a) Life span table  (b) Interference graph (a) Life span table     (b) Interference graph (a) Life span table     (b) Interference graph (a) Life span table  (b) Interference graph (a) Life span table  (b) Interference graph (a) Life span table (b) Interference graph

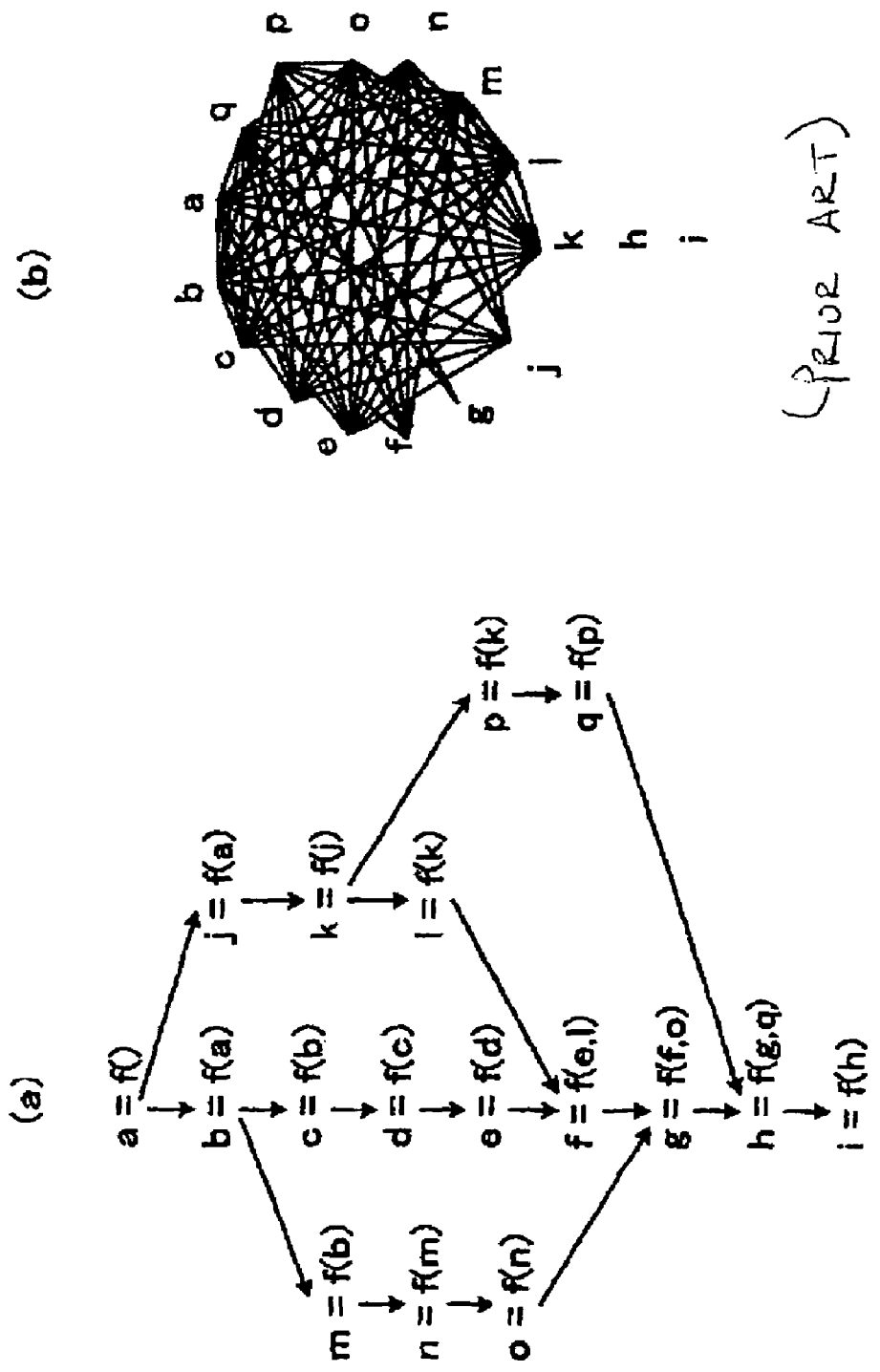

COMPILER AND REGISTER ALLOCATION METHOD

BACKGROUND OF THE INVENTION

1. Field of the Invention

The present invention relates to register allocation for instruction level parallel architectures.

2. Related Art

Generally, a program written in a programming language is optimized in many ways. As one optimization method, register allocation is conducted to obtain an effective usage of registers. According to one method for allocating registers, called coloring, a different color is assigned to each of the registers, and subsequently, registers are allocated based on the same principle as would be used for a process whereby colors were used to distinguish between program instructions.

Accompanying the improvements in the hardware functions of computers, parallel processing, involving multi-programming, has become popular. Also, for the allocation of registers for compiling, a register allocation method has been proposed that reflects the parallel execution of a program. For this type of register allocation for instruction level parallel architectures, it is important to suppress the deterioration of the parallel execution of instructions due to the generation of anti dependencies.

One conventional register allocation method, proposed by S. S. Pinter, is a coloring method that uses a parallelizable interference graph. This method is described in detail in reference document, "Register Allocation With Instruction Scheduling: A New Approach", S. S. Pinter, SIGPLAN '93 Conference On PLDI.

According to the graph coloring method using a parallelizable interference graph, it is assumed that an interference will occur between variables that are used for instructions executed in parallel, and different registers are allocated for variables that interfere with each other. With this method, anti dependencies between instructions that are to be executed in parallel are removed, and the parallel execution of code is ensured.

SUMMARY OF THE INVENTION

As is described above, the graph coloring method using the parallelizable interference graph is employed as a register allocation method that reflects parallel execution of a program. According this conventional method, graph coloring is performed so that different registers are employed for instructions that may be executed in parallel, i.e., when it is assumed an interference will occur between variables referred to by instructions that may be executed in parallel.

However, with this graph coloring method, which uses a parallelizable interference graph, since the latent probability of parallel execution is accepted for all instructions in a target program, the interference that could develop between variables is enormous. And when interference between variables is increased, the following problems arise.

1. The time required for compiling increases.
2. The interference level exceeds the number of actual registers, and spill code is required.

For the graph coloring, to cope with the interference level exceeds the number of actual registers, the method for preparing an interference graph after spill code is generated, and for performing re-coloring is generally employed. Therefore, when the interference level exceeds the number of actual registers, the coloring cost is greatly increased.

Further, making a spill decision is difficult when parallel execution by the program is taken into consideration.

FIGS. 19A and 19B are diagrams showing an interference graph formed using the conventional graph coloring method. Based on a DAG (Directed Acyclic Graph) in FIG. 19A, the interference graph in FIG. 19B is constructed. As is shown in FIG. 19B, for the interference graph, the number of interferences between the variables is enormous and providing an efficient register allocation process is difficult.

It is, therefore, one object of the present invention to reduce the number of interferences between variables during graph coloring, while maintaining the possibility that the instructions will be executed in parallel.

It is another object of the present invention to avoid, in graph coloring that endures the parallel execution of instructions, the extension of time required for compiling and generation of unnecessary spill code.

To achieve the above objects, according to the invention, a compiler, which converts into a machine language the source code of a program written in a programming language and optimizes the program, comprises: a DAG analysis unit for constructing and analyzing a DAG for an instruction in a program to be processed; an interference graph construction unit for employing the analysis results to construct an interference graph representing the probability that an interference will occur between variables used by the instruction; and a graph identifier for allocating registers for the instruction based on the interference graph that is constructed, wherein, when the overall time for executing the program is extended unless predetermined multiple instructions are executed in parallel, the interference graph construction unit assumes that an interference has occurred among variables used by the multiple instructions, and constructs the interference graph.

Thus, the minimum variable interference that guarantees the parallel execution of the program can be reflected in the interference graph.

The interference graph construction unit determines a phase arrangement order for nodes of the DAG, so that the execution interval for the program is minimized, and when the intervals are overlapped where the variables among the instructions in the phase arrangement order are present, the interference between the variables is reflected in the interference graph.

When multiple instructions in the program that may be executed in parallel are not executed in parallel, and when the overall execution time for the program is still not affected, the interference graph construction unit assumes that the variables defined by the multiple instructions do not interfere with each other, and the effect is reflected in the interference graph.

The DAG analysis unit of the compiler searches for instructions that are nodes of the DAG in accordance with the depth priority order, and uses the search results to generate a reverse post order. The interference graph construction unit extracts instructions based on the reverse post order, and determines whether interferences occur between variables used for the extracted instructions and other variables, while the determination results are reflected in the interference graph, so that the graph of the interferences can be constructed, step by step.

The DAG analysis unit of the compiler calculates, for the instructions that serve as the nodes of the DAG, both the degree of freedom permitted for changing an execution start time and the earliest execution start time. Then, based on the degree of freedom and the earliest execution start times for the instructions, the interference graph construction unit determines the execution start time for each of the instructions, employs the obtained execution start times to determine whether interferences occur between variables used by the instructions, and reflects the determination results in the interference graph to construct the interference graph.

The graph identification unit of the compiler allocates the same register to variables defined on the same path in the DAG that is constructed by the DAG analysis unit.

Further, according to the invention, a computer is provided that includes a compiler, for compiling source code for an input program, comprising: a DAG analysis unit, for constructing and analyzing a DAG for an instruction extracted from the program; an interference graph construction unit, for employing the analysis results to construct, with the condition that the overall execution time of the program will not be extended, an interference graph that is required to ensure the parallel execution of the program and that represents interferences between variables used by instructions in the program; and a register allocation unit for allocating registers to the instruction based on the interference graph that is prepared.

This computer further comprises: output means, for writing to the interference graph the register allocation results obtained by the register allocation unit, and for outputting the interference graph.

According to the invention, a register allocation method, which for the performance of optimization to improve programming efficiency employs graph coloring to allocate registers to instructions in a program, comprises the steps of: constructing and analyzing a DAG for the instructions based on the program; employing as a reference the longest non-parallel instruction queue (critical path) in the DAG, and constructing an interference graph assumes that an interference has occurred among variables used by the multiple instructions, based on the DAG analysis results, when the critical path queue is extended, unless predetermined multiple instructions are executed in parallel; and allocating registers for the instructions based on the obtained interference graph.

The step of constructing and analyzing the DAG includes the steps of: searching for instructions, in accordance with a depth priority order, that are nodes of the DAG; and generating a reverse post order for the search results.

The step of constructing the interference graph includes the steps of: extracting an instruction from the DAG in the obtained reverse post order, and determining whether an interference exists between a variable used by the extracted instruction and another variable; and constructing the interference graph by reflecting, in the interference graph, the determined interference between the variables.

More specifically, the step of constructing and analyzing the DAG includes the step of: calculating, for each of the instructions that serve as the nodes of the DAG, the degree of freedom permitted for changing an execution start time, and the earliest execution start time.

The step of constructing the interference graph includes the step of: employing the degree of freedom and the earliest execution start time to determine an execution start time for each of the instructions that are extracted from the DAG in the reverse post order. Based on the execution start time determined for each of the instructions, the interference between variables used in the instruction is determined.

The step of determining the execution start time for each instruction includes the step of: employing the degree of freedom and the earliest execution start time for the instruction to determine, when the execution start time for the instruction is delayed within a range wherein the overall program execution time is not extended and when the number of interferences between a function used for the instruction and another function is reduced, the execution start time for the instruction, the time whereat the number of interferences is minimized.

The present invention can also be prepared as a program that permits a computer to execute, for optimization, the above register allocation method during the compiling of a program, and this program may be stored on a storage medium, or transmitted by a program transmission apparatus.

10, and showing the results obtained by extracting and processing the fourteenth and fifteenth instructions.

Figure 10:
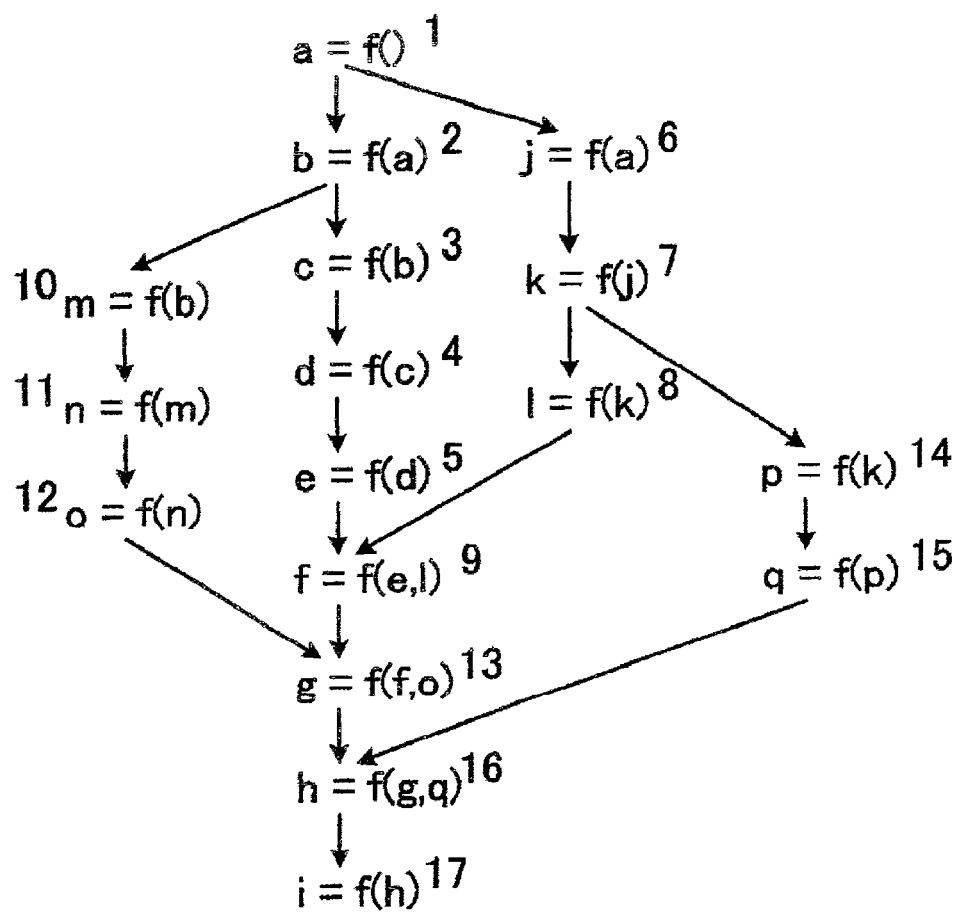
FIG. 10 is a diagram showing the reverse post order obtained by performing a search of the DAG in FIG. 7 in accordance with the depth priority order.
Figure 11:
FIGS. 11A and 11B are diagrams for explaining the state wherein the life span table and the interference graph are prepared by using the reverse post order of the DAG in FIG. 10, and showing the results obtained by extracting and processing the first to fifth instructions.
Figure 11:
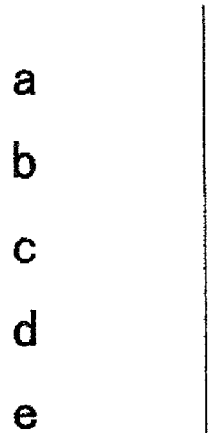
Figure 12:
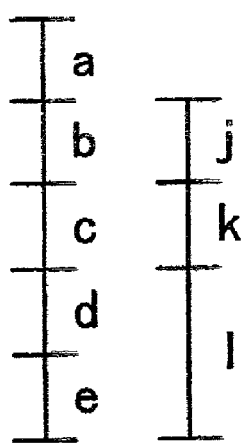
FIGS. 12A and 12B are diagrams for explaining the state wherein the life span table and the interference graph are prepared by using the reverse post order of the DAG in FIG. 10, and showing the results obtained by extracting and processing the sixth to eighth instructions.
Figure 12:
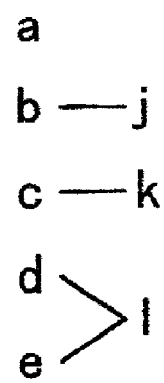
Figure 13:
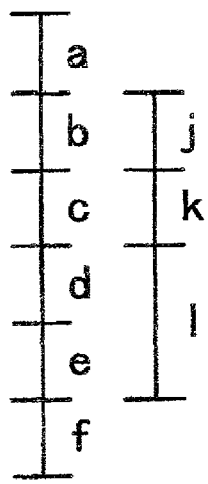
FIGS. 13A and 13B are diagrams for explaining the state wherein the life span table and the interference graph are prepared by using the reverse post order of the DAG in FIG. 10, and showing the results obtained by extracting and processing the ninth instruction.
Figure 13:
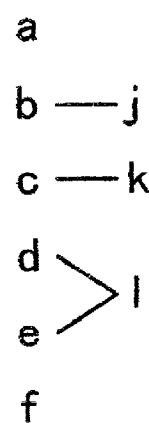
Figure 14:
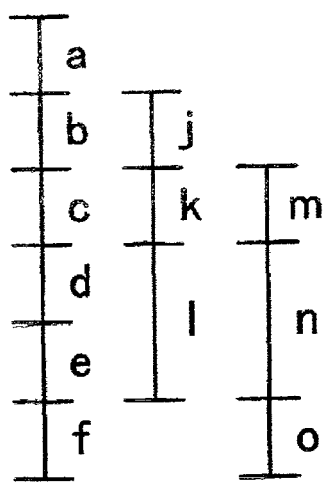
FIGS. 14A and 14B are diagrams for explaining the state wherein the life span table and the interference graph are prepared by using the reverse post order of the DAG in FIG. 10, and showing the results obtained by extracting and processing the tenth to twelfth instructions.
Figure 14:
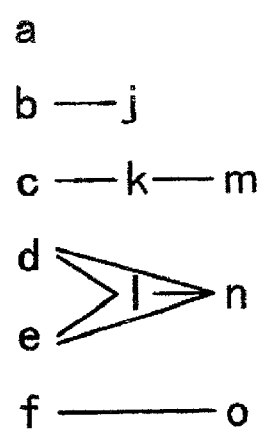
Figure 15:
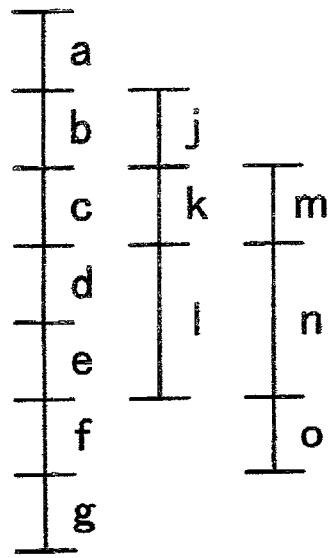
FIGS. 15A and 15B are diagrams for explaining the state wherein the life span table and the interference graph are prepared by using the reverse post order of the DAG in FIG. 10, and showing the results obtained by extracting and processing the thirteenth instruction.
Figure 15:
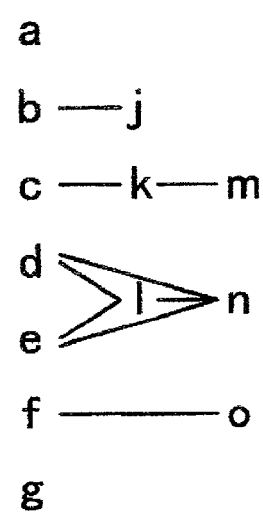
Figure 16:
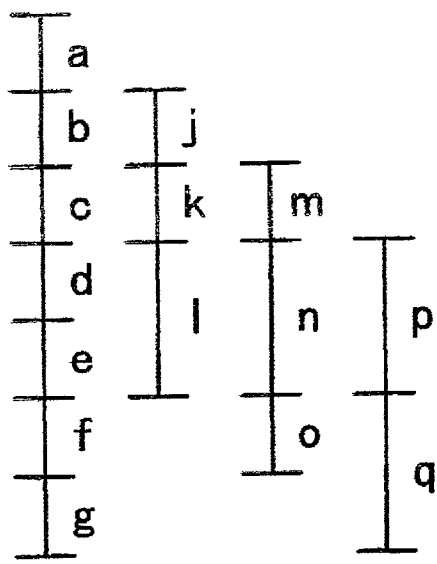
FIGS. 16A and 16B are diagrams for explaining the state wherein the life span table and the interference graph are prepared by using the reverse post order of the DAG in FIG.
Figure 16:
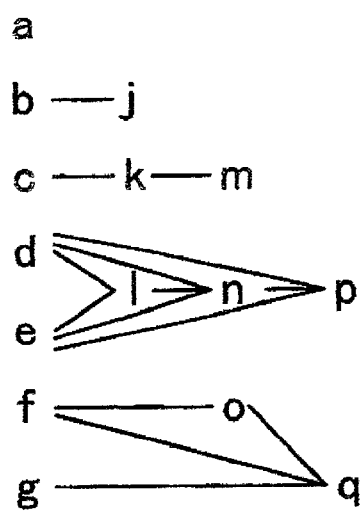

FIGS. 17A and 17B are diagrams for explaining the state wherein the life span table and the interference graph are prepared by using the reverse post order of the DAG in FIG. 10, and showing the results obtained by extracting and processing the sixteenth and seventeenth instructions.

Figure 17:
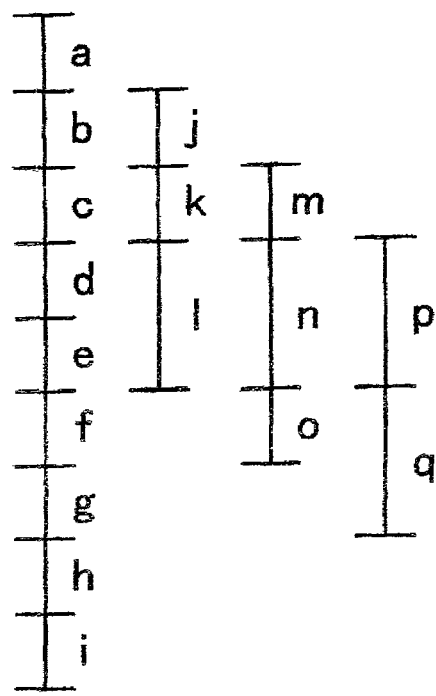
Figure 17:
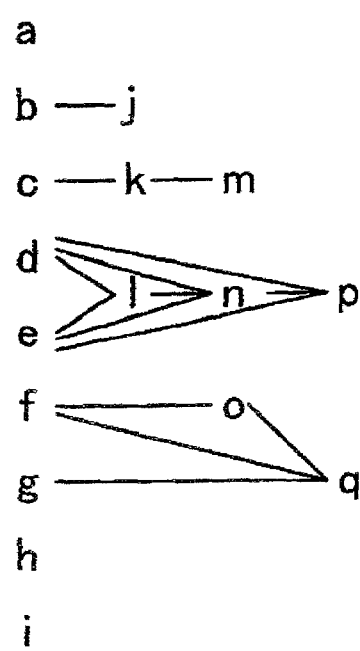
Figure 18:
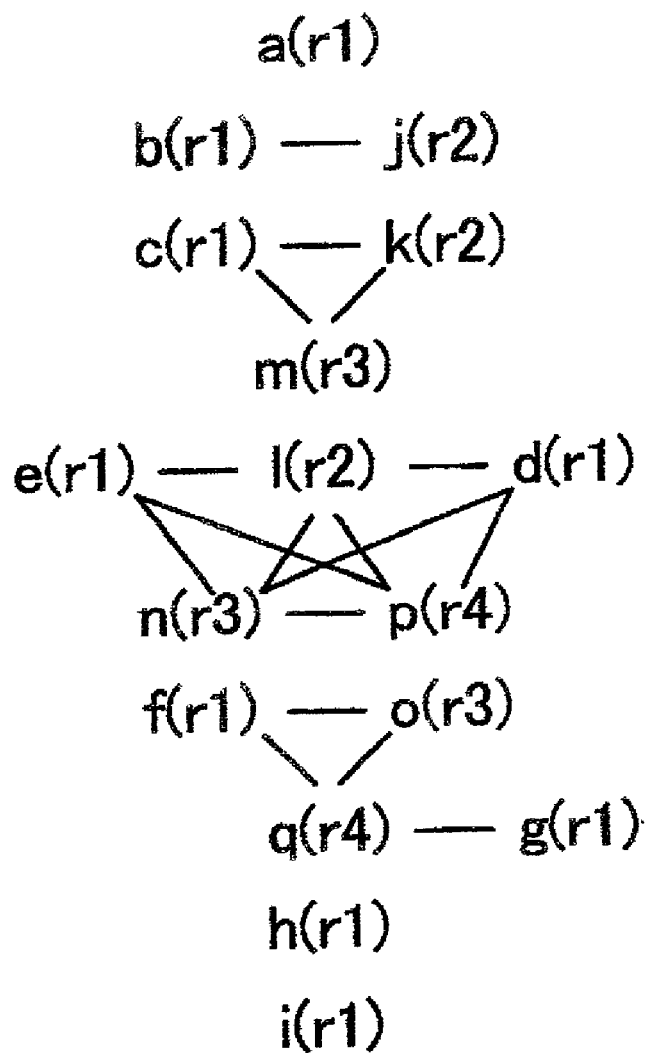

FIG. 18 is a diagram showing the results obtained by register allocation for an interference graph in FIG. 17.

FIG. 19 is a diagram showing an example interference graph constructed using the conventional graph coloring method.

DESCRIPTION OF THE PREFERRED EMBODIMENTS

The preferred embodiment of the present invention will now be described in detail while referring to the accompanying drawings.

An overview of the invention will now be given. According to the invention, a DAG (Directed Acyclic Graph), a directed graph that represents the order for the execution of the instructions in a program to be compiled, is prepared, and the degree whereat each instruction affects the execution time is calculated, based on the DAG. The instructions are arranged based on an obtained degree, and an interference graph is constructed while taking into account the order in which the instructions are executed. That is, with the condition that the overall program execution time will not be extended, an interference graph is prepared that includes an interference for guaranteeing the minimum required parallel execution.

To implement this, in this invention the phase arrangement order of nodes (instructions in the program) in the DAG is determined, so that the shortest execution time can be provided for the program. When the intervals whereat variables for the existing instructions are overlapped in accordance with this order, only the interference between the variables is reflected in the interference graph. The interval whereat a variable exists refers to an interval extending from an instruction, which defines the variable, to the last instruction, according to this definition, that used the variable. For example, assume that an instruction A employs a variable a and an instruction B employs a variable b, and that the instructions A and B are to be executed in parallel. At this time, when as a result of a predetermined phase arrangement the instruction B is to be executed following the interval whereat the variable a exists, the interference graph is constructed in accordance with this phase arrangement order, while assuming that no interference occurs between the variables a and b.

Furthermore, according to the invention, the parallel execution is abandoned within a range wherein the overall program execution time is not affected. That is, only an interference that guarantees the parallel execution of the important portion of the program is reflected in the interference graph.

Using the above described method, for this invention the number of interferences between variables to be considered is minimized. Specifically, since the instructions are sorted and the execution order is determined, while taking into account that the overall execution speed of the program is not reduced, it is possible to remove a transient interference probability that occurs in accordance with the parallel execution of the program and based on the degree of freedom of each instruction relative to the execution order.

Therefore, while the parallel execution of the instructions is ensured, the number of interferences can be greatly reduced, and as a result, the graph coloring can be performed using an interference graph consisting of fewer components, while the time and the costs required for the calculations can be reduced.

Figure 1:
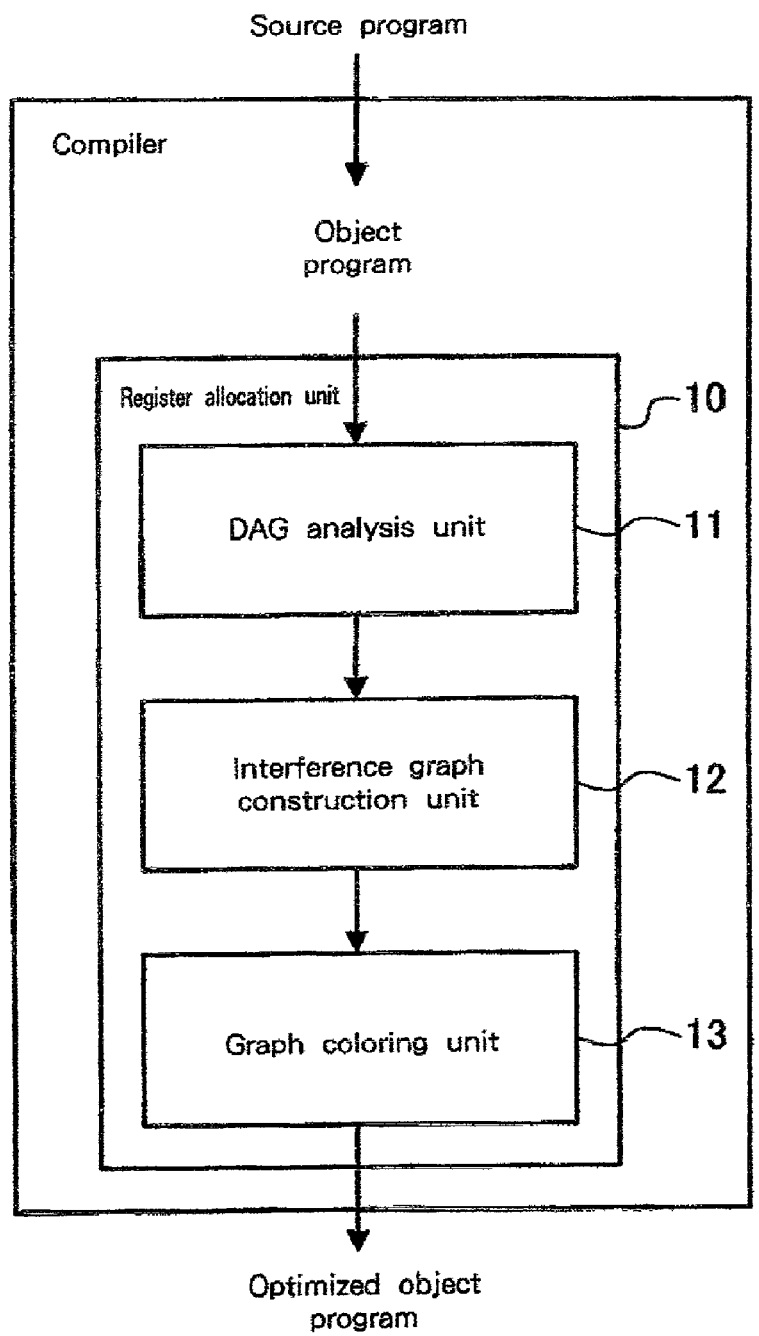
FIG. 1 is a diagram for explaining the configuration of a register allocation unit in a compiler according to one embodiment of the present invention.

FIG. 1 is a diagram for explaining the configuration of a register allocation unit in a compiler according to the embodiment of the invention.

In FIG. 1, a register allocation unit 10 in this embodiment that performs register allocation for instructions in a program comprises a DAG analysis unit 11, an interference graph construction unit 12 and a graph coloring unit 13. The DAG analysis unit 11 prepares a DAG from a target program to be processed, and performs the analyzation that is required for the generation of an interference graph. The interference graph construction unit 12 constructs an interference graph based on the analysis performed by the DAG analysis unit 11. And the graph coloring unit 13 colors the interference graph prepared by the interference graph construction unit 12, and initiates the register allocation.

The components of the register allocation unit 10 in FIG. 1 are virtual software blocks implemented by a CPU that is controlled by a computer program. The computer program that controls the CPU is provided by storing it on a storage medium, such as a CD-ROM or a floppy disk, or by transmitting it via a network.

Figure 2:
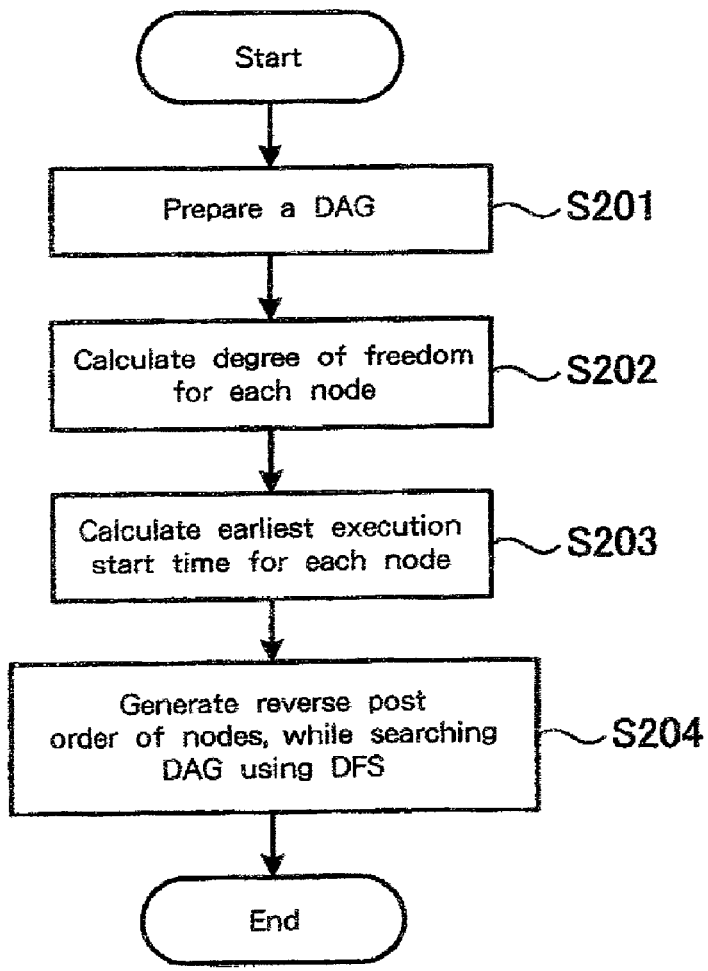
FIG. 2 is a flowchart for explaining the operation of a DAG analysis unit according to the embodiment.

With this arrangement, the DAG analysis unit 11 prepares a DAG from the target program, calculates the degree of freedom and the earliest execution start time for each instruction that serves as a node, and searches the nodes of the DAG in accordance with the depth priority order, while generating a reverse post order based on the search results. FIG. 2 is a flowchart for explaining the operation of the DAG analysis unit 11.

Figure 7:
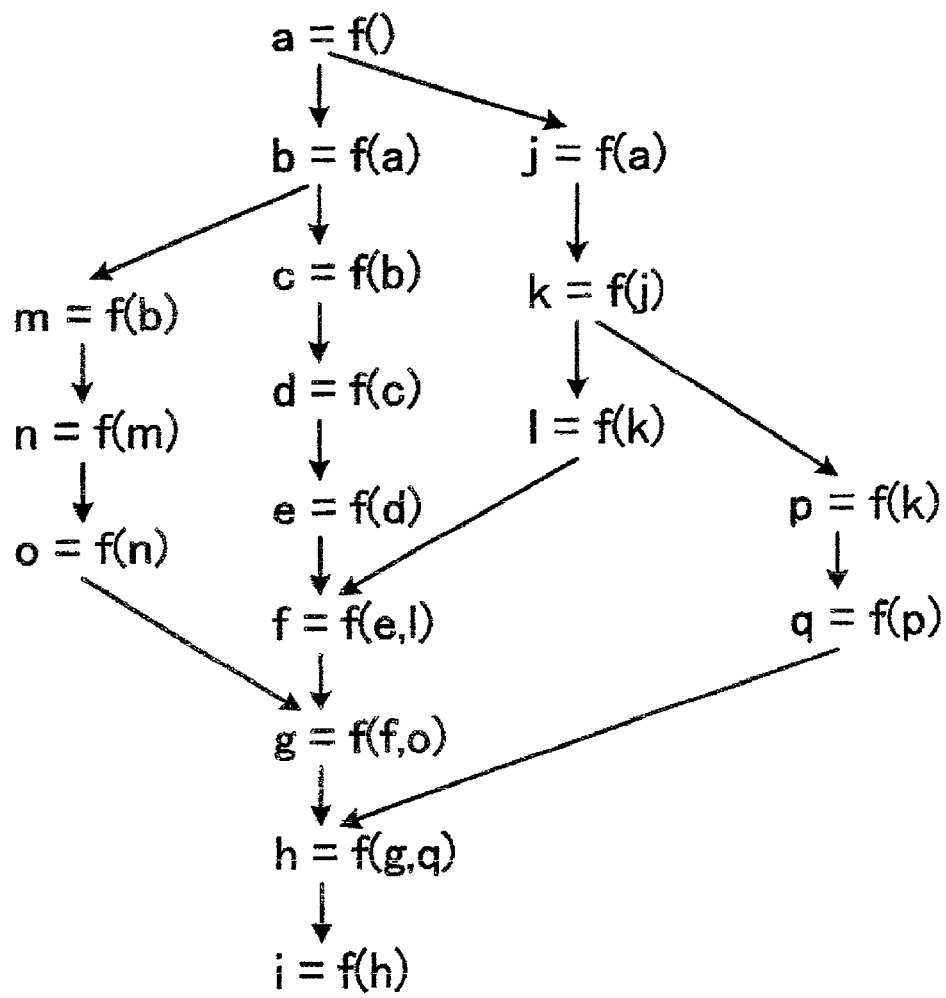
FIG. 7 is a diagram showing an example arrangement of a DAG according to the embodiment.

In FIG. 2, the DAG analysis unit 11 generates a DAG from a target program to be processed (step S201). An example DAG is shown in FIG. 7. In FIG. 7, the instruction queue from instruction a=f( ) to instruction i=f(h) is the longest instruction queue that can not be executed in parallel, and is the critical path of the DAG. A sub-path from instruction j=f(a) to instruction l=f(k) is an instruction queue that can be executed in parallel to instruction b=f(a) to instruction e=f(d) in the critical path. Similarly, a sub-path from instruction m=f(b) to instruction o=f(n) is an instruction queue that can be executed in parallel to instruction c=f(b) to instruction f=f(e, l) in the critical path. Further, a sub-path from instruction p=f(k) to instruction q=f(p) is an instruction queue that can be executed in parallel to instruction k=f(j) to instruction g=f(f, o) in the critical path.

Then, the degree of freedom for each node (instruction) of the DAG is calculated (step 202). The degree of freedom is an index that represents the distance the instruction can be moved on the DAG without the critical path of the DAG being extended. In other words, the degree of freedom is a level whereat the execution start time of the instruction can be changed. As the degree of freedom is reduced, the closer the location of the instruction comes to being fixed, so that the instruction can be regarded as important.

The degree of freedom for each node is calculated using the top level value and the bottom level value of the node. When a node is v, the top level value is $lt(v)$ and the bottom level value is $lb(v)$, the degree of freedom $sl(v)$ is represented as being $sl(v)=$(length of the critical path of the graph)$-lt(v)-lb(v)$.

When the number of execution cycles of the node v is cy(v), the top level value lt(v) of each node is obtained as follows.
if v=the top node of the graph, then $$lt(v)=0$$

else lt(v)=max(lt(p)+cy(p))
p ∈ pred(v), where pred(v) is a set of predecessors of the node v. The bottom level lb(v) of each node is obtained as follows.
if v=the bottom node of the graph, then $$lb(v)=0$$

else lb(v)=max(lt(s)+cy(v))
s ∈ succ (v), where succ(v) is a set of successors of the node v.

Figure 8:
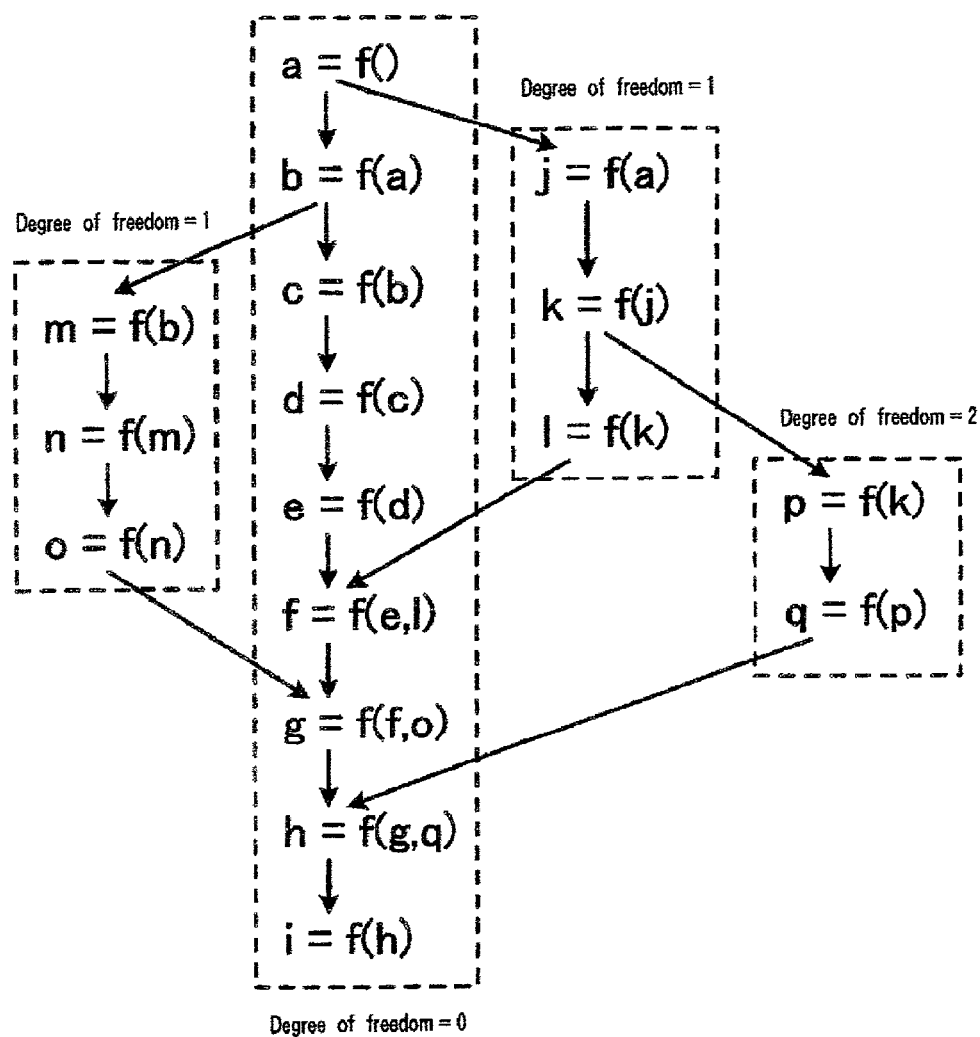
FIG. 8 is a diagram showing the degree of freedom of each instruction on the DAG in FIG. 7.

FIG. 8 is a diagram showing the degrees of freedom for the instructions obtained by the above equations. In FIG. 8, the degrees of freedom for instructions a=f( ) to i=f(h), which together form the critical path, are 0. The degrees of freedom for instructions j=f(a) to l=f(k) are 1. The degrees of freedom for instructions m=f(b) to o=f(n) are 1. And the degrees of freedom for instructions p=f(k) to q=f(p) are 2.

Figure 9:
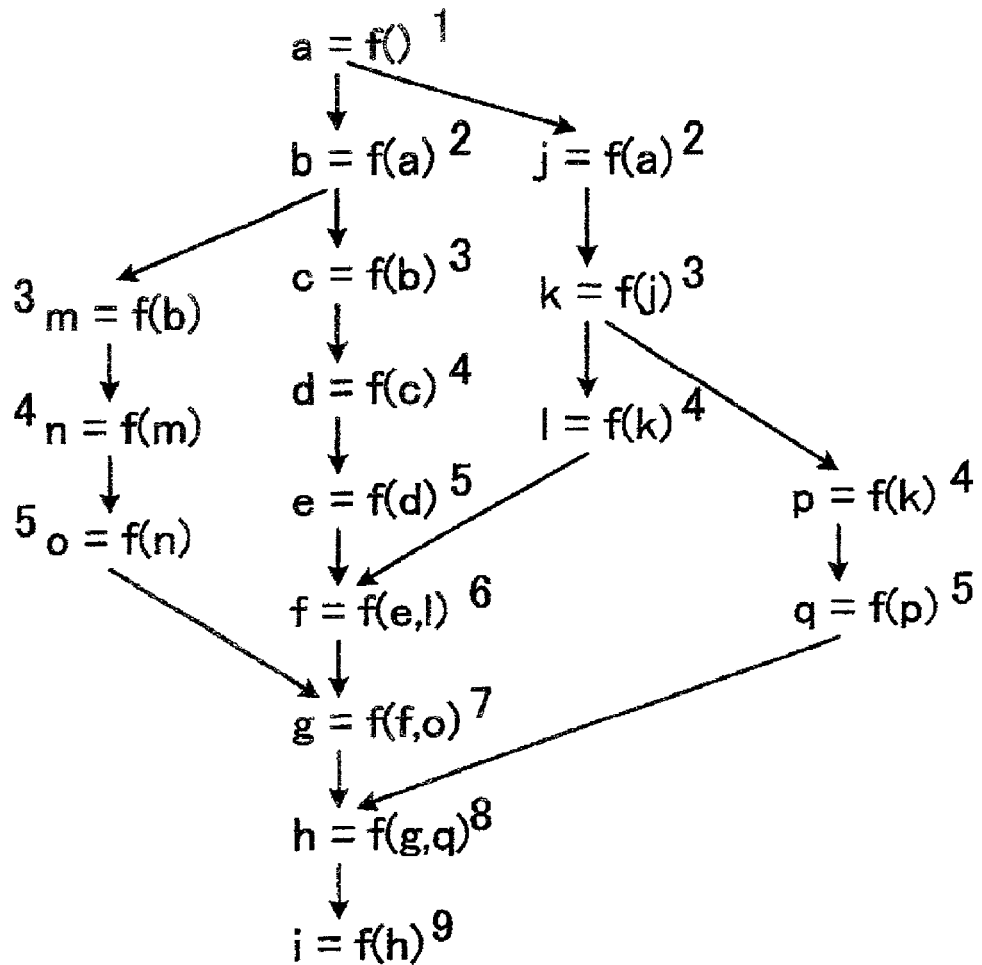
FIG. 9 is a diagram showing the earliest execution start times for the instructions on the DAG in FIG. 7.

The earliest execution start time for each node (instruction) in the DAG is then calculated (step 203). The earliest execution start time is the earliest time (cycle), beginning with the first instruction a=f( ), whereat the instructions can be executed. The earliest execution start times for the nodes in the DAG in FIG. 7 are shown in FIG. 9. In FIG. 9, since instruction b=f(a) and instruction j=f(a) executed, are at the earliest, immediately after instruction a=f( ), the earliest execution start time is 2. Further, since instruction m=f(b) is executed, at the earliest, immediately after instruction b=f (a), the earliest execution start time is 3.

Following this, the DAG is searched in accordance with the depth priority order, and the reverse post order is obtained as the search results (step 204). When the route is branched and multiple search routes are present, the branch having the greater degree of freedom is employed first. In FIG. 9, of the instructions b=f(a) and j=f(a) positioned immediately following instruction a=f( ), instruction j=f(a) is first employed for the search because its degree of freedom is greater. Thus, in the reverse post order obtained at this step, the node having the smaller degree of freedom (i.e., a more important instruction) appears first. FIG. 10 is a diagram showing the reverse post order obtained when the DAG is searched in accordance with the depth priority order in FIG. 7. The numerals attached to the instructions in FIG. 10 represent the order wherein the nodes (instructions) appear in the reverse post order.

The interference graph construction unit 12 constructs an interference graph, step by step, by employing the reverse post order of the nodes (instructions) shown on the DAG that is generated by the DAG analysis unit 11, and the degrees of freedom and the earliest execution start times for the instructions.

Specifically, as the instructions are sorted, they are extracted in the order corresponding to the reverse post order obtained by searching the DAG in accordance with the depth priority order. The interference between a variable used in an instruction and a variable used in its preceding instruction is examined, and is sequentially added to the interference graph. Thus, for the nodes on the DAG, the phase arrangement order that represents the relative order of the nodes is determined, so that the program execution time is minimized. When, in the obtained order, there is overlapping of the intervals whereat the variables of the instructions appear, only the interference between the pertinent variables is reflected on the interference graph. During the process for adding to the interference graph an interference between a variable used in a predetermined instruction and a variable that appeared previously, when the overlapping of the interval for the variable defined in the predetermined instruction and an interval for another variable can be reduced by delaying the execution start time of the instruction within a range that will not delay the overall program execution time, the execution start time for the instruction is delayed and the interference is reduced. As a result, only that interference which guarantees the parallel execution of an important portion of the program will be reflected on the interference graph, and parallel execution can be abandoned within a range that ensures the overall program execution time will not affected.

Figure 3:
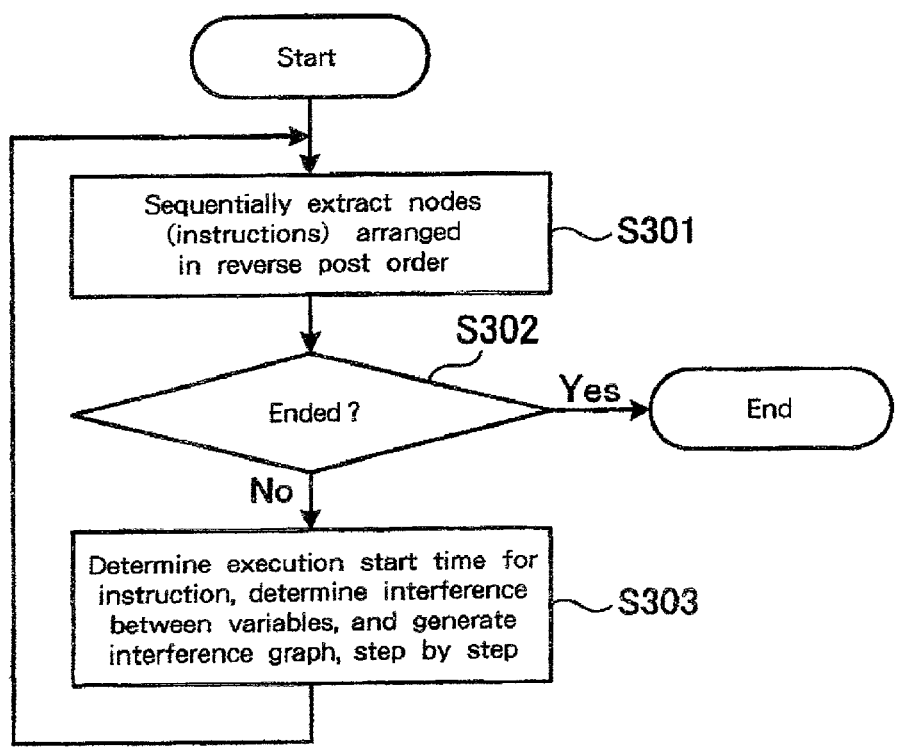
FIG. 3 is a flowchart for explaining the operation of an interference graph construction unit according to the embodiment.

FIG. 3 is a flowchart for explaining the operation of the interference graph construction unit 12.

In FIG. 3, first, the interference graph construction unit 12 sequentially extracts the nodes (instructions) in the reverse post order obtained by the DAG analysis unit 11 (step 301). The interference graph construction unit 12 then determines the execution start times for the extracted instructions, determines the interference between variables based on the execution start times, and prepares an interference graph, step by step (steps 302 and 303). This processing is performed for all instructions in the order that corresponds to the reverse post order (step 302).

Figure 4:
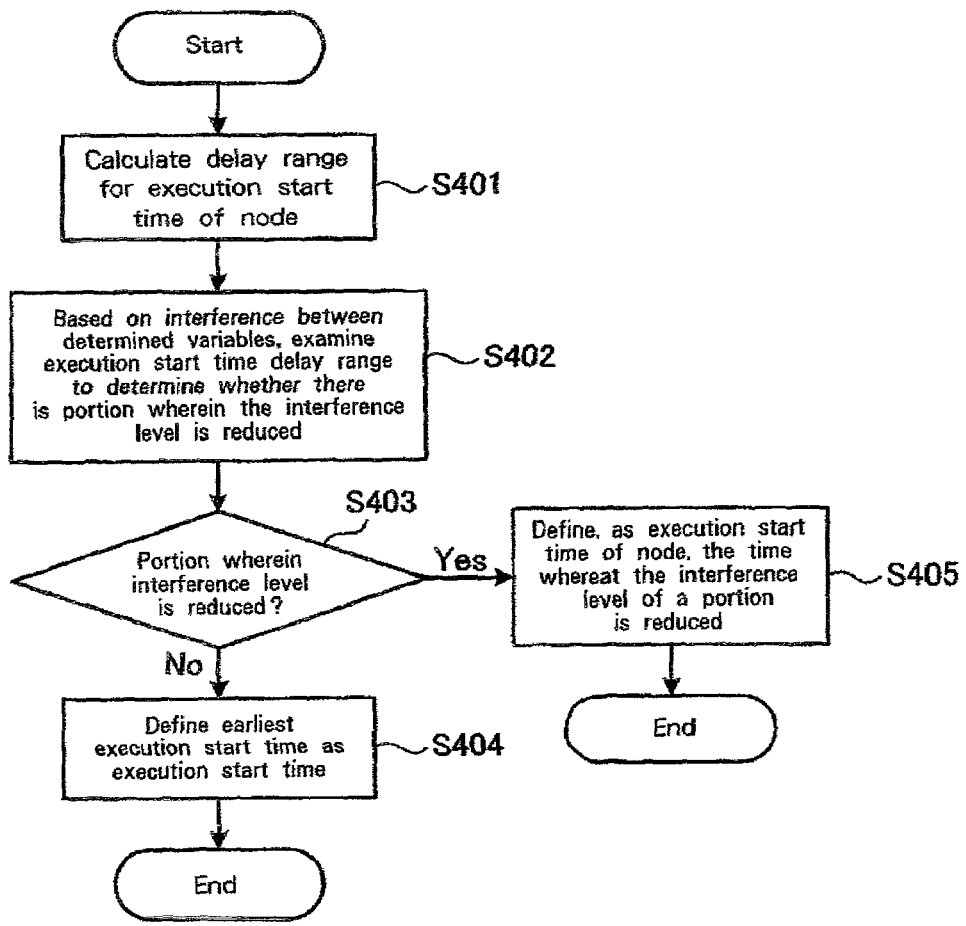
FIG. 4 is a detailed flowchart for explaining the process at step 303 in the flowchart in FIG. 3.

FIG. 4 is a detailed flowchart for explaining the process at step 303 in the flowchart in FIG. 3.

In FIG. 4, the interference graph construction unit 12 calculates the delay range for the execution start time of an instruction that is extracted from the reverse post order of the DAG (step 401). The calculation of the delay range for the execution start time of the instruction will now be explained while referring to the flowchart in FIG. 5.

Figure 5:
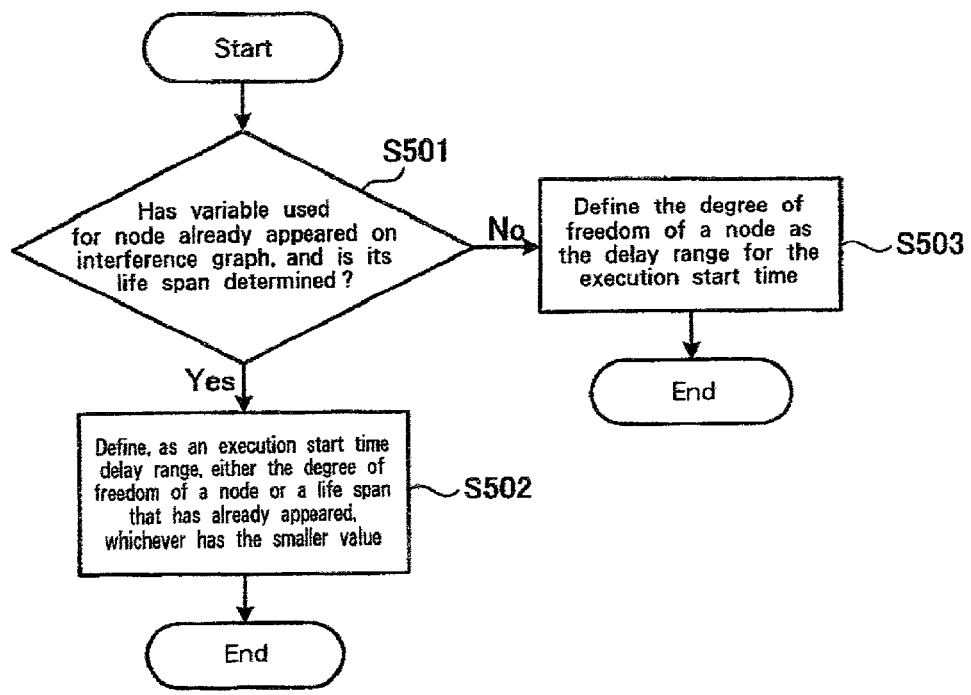
FIG. 5 is a detailed flowchart for explaining the process at step 401 in the flowchart in FIG. 4.

In FIG. 5, first, a check is performed to determine whether a variable used in the extracted instruction has already appeared in the interference graph that is being constructed, and whether the interval whereat the variable appears has been determined (step 501). When the interval for the variable has been determined, either the degree of freedom of the instruction or the interval whereat the variable appears, whichever has the smaller value, is defined as the delay range for the execution start time of the instruction (step 502). When the interval whereat the variable appears has not been determined, the degree of freedom for the instruction is defined as the delay range for the execution start time of the instruction (step 503). That is, when the interval whereat the variable appears has already been determined, the execution start time of the instruction is determined to lie within the range wherein the interval is not extended.

Referring again to FIG. 4, the interference graph construction unit 12 examines the delay range determined at step 401 to obtain the execution start time for the instruction and to ascertain whether between the variables that have been determined there is a portion wherein the interference level has been reduced (step 402). As an example method, a life span table is prepared for the variables that currently appear on the thus constructed interference graph, and the intervals, recorded in the table, whereat the variables appeared are compared with the delay range of the execution start time for the instruction. The timing for the execution start time is then delayed, relative to the earliest execution start time, to determine whether interference with another variable shown in the life span table can be reduced.

When there is no portion wherein the interference is reduced, the earliest execution start time is determined to be the execution start time for the instruction (steps 403 and 404).

When there is a portion wherein the interference is reduced, the pertinent time is defined as the execution start time for the instruction (steps 403 and 405). And when, at step 405, the execution start time of the instruction is delayed relative to the earliest execution start time, the degree of freedom and the re-transmission execution start time are re-calculated for an instruction that can be reached from the pertinent instruction and for which the degree of freedom is greater. This process may be performed by permitting the DAG analysis unit 11 to perform it while designating the instruction, or by providing the re-calculation function for the interference graph construction unit 12.

Through this processing, an execution start time for an instruction is determined each time the instruction is extracted from the reverse post order of the DAG. Thus, interference between the variable used in the instruction and another variable can be determined, and the results can be reflected in the interference graph.

FIGS. 11 to 17 are diagrams for explaining the state wherein the life span table is prepared by extracting the nodes (instructions), in the reverse post order of the DAG in FIG. 10, and the interference graph is constructed.

FIGS. 11A and 11B are diagrams showing the results obtained by extracting and processing the first to the fifth instructions in FIG. 10. Since there is no interference between variables, the earliest execution start times are defined as the execution start times for all the instructions.

FIGS. 12A and 12B are diagrams showing the results obtained by extracting and processing the sixth to eighth instructions in FIG. 10. Based on the flowchart in FIG. 5, each of the sixth to eighth instructions has a delay range for an execution start time that is equivalent to one cycle and that corresponds to a degree of freedom of 1. However, since the number of interferences with other variables is not reduced, even by delaying the execution start times of the instructions, for each instruction the earliest execution start time is defined as the execution start time.

FIGS. 13A and 13B are diagrams showing the results obtained by extracting and processing the ninth instruction in FIG. 10. Since this instruction is executed following the end of the intervals in FIG. 12A whereat all the variables appeared, it is assumed that for the ninth instruction there is no interference between variables. Therefore, the earliest execution start time is defined as the execution start time for the ninth instruction.

FIGS. 14A and 14B are diagrams showing the results obtained by extracting and processing the tenth to twelfth instructions in FIG. 10. In this example, each of the tenth to the twelfth instructions has a delay range for the execution start time that is equivalent to one cycle and that corresponds to a degree of freedom of 1. However, since for the tenth and eleventh instructions the number of interferences with other variables is unchanged, even by delaying the execution start times, the earliest execution start times are the execution start times for these instructions. As for the twelfth instruction, when the execution start time is delayed one cycle, the number of interferences with variable o can be reduced (as is shown in FIG. 14B, interference occurs only with variable f). Thus, for the twelfth instruction the execution start time is delayed one cycle relative to the earliest execution start time.

FIGS. 15A and 15B are diagrams showing the results obtained by extracting and processing the thirteenth instruction in FIG. 10. Since the variable used in the instruction does not appear in the interference graph in FIG. 14B, no variable interferes with variable g. Therefore, the earliest execution start time is defined as the execution start time for the instruction.

FIGS. 16A and 16B are diagrams showing the results obtained by extracting and processing the fourteenth and fifteenth instructions in FIG. 10. The fourteenth instruction has a delay range for the execution start time that is equivalent to one cycle and corresponds to the intervals at which the variables l and n, which interfere with variable p, are present. However, since the number of interferences with other variables is not reduced even by delaying the execution start time of the fourteenth instruction, the earliest execution start time is defined as the execution start time for this instruction. The fifteenth instruction has a delay range for the execution start time that is equivalent to one cycle and that corresponds to a degree of freedom of 2 and to the interval wherein a variable that interferes with the variable q is present. Thus, when the execution start time of the fifteenth instruction is delayed by one cycle, the number of interferences for the variable q can be reduced (as is shown in FIG. 16B, the variable q interferes only with the variable g). Thus, the execution start time of the fifteenth instruction is delayed one cycle relative to the earliest execution start time.

Since there is no instruction that can be reached from the fifteenth instruction and that has a greater degree of freedom than the fifteenth instruction, no re-calculation of the degree of freedom is performed.

FIGS. 17A and 17B are diagrams showing the results obtained by extracting and processing the sixteenth and the seventeenth instructions in FIG. 10. Since these instructions are performed in order following the end of all the intervals for all the variables in FIG. 16A, it is assumed that there is no variable interference, and therefore, the earliest execution start time is defined as the execution start time of the instructions.

Through the above processing, while the minimum required parallel execution is ensured without the overall program execution time being extended, an interference graph is constructed wherein the number of interferences between variables is minimized to the extent possible.

The graph coloring unit 13, which serves as a graph identification unit, analyzes the interference graph that is constructed by the interference graph construction unit 12 in the above manner, and identifies the node. Then, based on the identification results, the graph coloring unit 13 initiates register allocation. According to the register allocation method of this embodiment, the graph coloring is performed in such an image that the interference graph is filled (colored) with colors assigned to the registers. For graph coloring, the anti dependencies that are present across the sub-paths of the DAG are minimized to the extent possible. That is, information for the branch to the sub-path of the DAG is employed to assign the same color to variables defined on the same sub-path. A method other than the graph coloring method of this embodiment may be employed to identify the nodes on the interference graph and to perform register allocation.

In this embodiment, as is described above, in the interference graph constructed by the interference graph construction unit 12, the number of interferences among variables is reduced for instructions that do not affect the overall program execution time, even when they are not executed in parallel. Therefore, since the number of interference levels between the variables is reduced, graph coloring can be performed at high speed. However, as a result of the reduction of the interference levels, anti dependencies tends to occur due to the assignment of the same color (allocation of the same register) to different variables. The occurrence of the anti dependencies may limit the degree of freedom of an instruction scheduler that is to be executed after the register allocation. For example, for the optimization performed for a high-level intermediate language, the occurrence of anti dependencies would constitute a barrier for the instruction scheduler in a case wherein the register allocation is performed by graph coloring, while the degree of freedom of the instruction scheduler is maintained at a low level, and where the instruction scheduler process is performed while taking into account detailed hardware resources.

Thus, as is described above, when the coloring is performed using the path information (branch information for the sub-path) of the DAG, the occurrence of anti dependencies can be minimized, and in the compiling of the program, the degree of freedom afforded the instruction scheduler process, which in this embodiment is to be performed after the register allocation, can be maintained.

Figure 6:
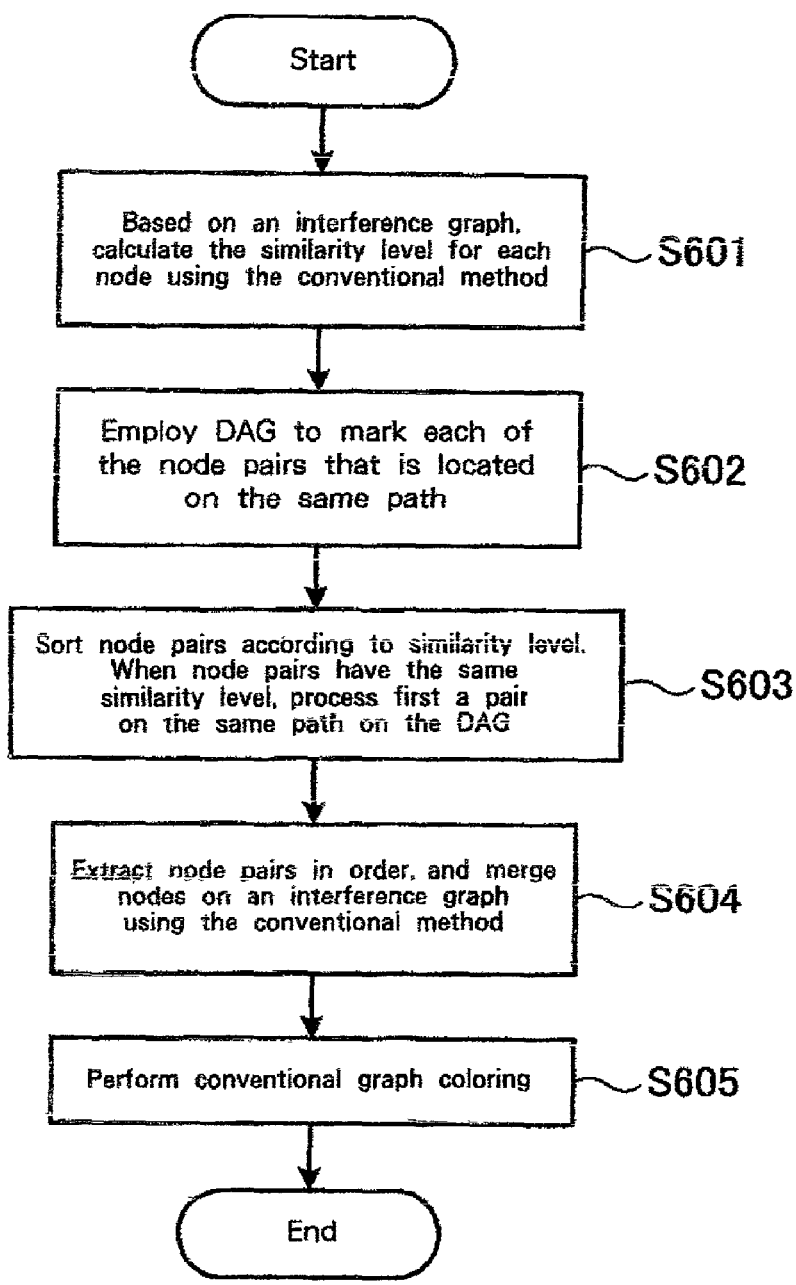
FIG. 6 is a flowchart for explaining the operation performed by the graph coloring unit according to the embodiment.

FIG. 6 is a flowchart for explaining the operation of the graph coloring unit 13.

In FIG. 6, first, the graph coloring unit 13 calculates the interference similarity of a pair of nodes on the interference graph constructed by the interference graph construction unit 12 (step 601). The conventional method used for graph coloring can be employed as the method for calculating the interference similarity.

A check is then performed to determine whether the two nodes of each pair on the interference graph are located on the same path of the DAG (step 602). Thereafter, the node pairs on the interference graph are sorted in accordance with the similarity level (step 603). When node pairs are present that have the same similarity level, a pair located on the same path on the DAG is sorted first, based on the results obtained at step 602.

The node pairs that are sorted are extracted in order, from the beginning, and the merging of nodes is performed (step 604). The conventional method used for graph coloring can be employed as the node merging method.

Finally, the graph coloring is performed for the interference graph wherein the merging of node pairs has been completed (step 605). For this, the conventional graph coloring method can also be employed. As is described above, the same color is assigned for variables defined on the same sub-path on the DAG.

FIG. 18 is a diagram showing the results obtained by the allocation of registers (r1, r2, r3 and r4) through the graph coloring used for the interference graph in FIG. 17B.

In FIG. 18, the allocated registers are represented by the symbols in parenthesis that are attached to the nodes.

When the interference graph in FIG. 18 is compared with the interference graph constructed by the conventional graph coloring method in FIG. 19, it is found that, for the interference graph in FIG. 18 in this embodiment, the number of interferences between variables is considerably reduced, while the probability that instructions will be executed in parallel is fully guaranteed.

As is described above, according to the invention, the number of interferences between variables can be reduced during graph coloring, while the possibility that instructions will be executed in parallel is maintained.

Further, for graph coloring that ensures the parallel execution of instructions, the need to expend an extended time for the compiling and the generation of unnecessary spill code can be avoided.

The invention claimed is:

1. A computer-readable medium embodying a computer-executable compiler, which converts into a machine language the source code of a program written in a programming language and optimizes said program, comprising:
   a directed acyclic graph DAG analysis unit for constructing and analyzing a DAG for an instruction in a program to be processed;
   an interference graph construction unit for employing the analysis results obtained by said DAG analysis unit to construct an interference graph representing the probability that an interference will occur between variables used by said instruction, wherein said interference graph construction unit determines a phase arrangement order for nodes of said DAG, so that said execution interval for said program is minimized, and when the intervals are overlapped where the variables among said instructions in said phase arrangement order are present, said interference between said variables is reflected in said interference graph; and
   a graph identifier for allocating registers for said instruction using said interference graph that is constructed by said interference graph construction unit,
   wherein, when the overall time for executing said program is extended unless predetermined multiple instructions are executed in parallel, said interference graph construction unit assumes that an interference has occurred among variables used by said multiple instructions, and constructs said interference graph.

2. The computer-readable medium embodying a computer-executable compiler according to claim 1, wherein, when multiple instructions in said program that may be executed in parallel are not executed in parallel, and when the overall execution time for said program is still not affected, said interference graph construction unit assumes that said variables defined by said multiple instructions do not interfere with each other, and said effect is reflected in said interference graph.

3. The computer-readable medium embodying a computer-executable compiler according to claim 1, wherein said DAG analysis unit of said compiler searches for instructions that are nodes of said DAG in accordance with the depth priority order, and uses the search results to generate a reverse post order; and wherein said interference graph construction unit extracts instructions based on said reverse post order obtained by said DAG analysis unit, and determines whether interferences occur between variables used for said extracted instructions and other variables, while the determination results are reflected in said interference graph, so that said graph of said interferences, can be constructed, step by step.

4. The computer-readable medium embodying a computer-executable compiler according to claim 1, wherein said DAG analysis unit of said compiler calculates, for said instructions that serve as the nodes of said DAG, both the degree of freedom permitted for changing an execution start time and the earliest execution start time; and wherein, based on said degree of freedom and said earliest execution start times for said instructions obtained by said DAG analysis unit, said interference graph construction unit determines the execution start time for each of said instructions, employs said obtained execution start times for said instructions to determine whether interferences occur between variables used by said instructions, and reflects said determination results in said interference graph to construct said interference graph.

5. The computer-readable medium embodying a computer-executable compiler according to claim 1, wherein said graph identification unit allocates the same register to variables defined on the same path in said DAG that is constructed by said DAG analysis unit.

6. A computer that includes a compiler, for compiling source code for an input program, comprising:
    a directed acyclic graph DAG analysis unit, for constructing and analyzing a DAG for an instruction extracted from said program;
    an interference graph construction unit, for employing the analysis results obtained by said DAG analysis unit to construct, with the condition that the overall execution time of said program will not be extended, an interference graph that is required to ensure the parallel execution of said program and that represents interferences between variables used by instructions in said program, wherein said interference graph construction unit determines a phase arrangement order for nodes of said DAG, so that said execution interval for said program is minimized, and when the intervals are overlapped where the variables among said instructions in said phase arrangement order are present, said interference between said variables is reflected in said interference graph; and
    a register allocation unit for allocating registers to said instruction using said interference graph that is prepared by said interference graph construction unit.

7. The computer according to claim 6, further comprising:
    output means, for writing to said interference graph the register allocation results obtained by said register allocation unit, and for outputting said interference graph.

8. A register allocation method, which for the performance of optimization to improve programming efficiency employs graph coloring to allocate registers to instructions in a program, comprising the steps of:
    constructing and analyzing a directed acyclic graph DAG for each of said instructions based on said program;
    employing as a reference the longest non-parallel instruction queue in said DAG, and constructing an interference graph that assumes that an interference has occurred among variables used by said multiple instructions, based on the DAG analysis results, when said instruction queue is extended, unless predetermined multiple instructions are executed in parallel, wherein said constructing determines a phase arrangement order for nodes of said DAG, so that said execution interval for said program is minimized, and when the intervals are overlapped where the variables among said instructions in said phase arrangement order are present, said interference between said variables is reflected in said interference graph; and
    allocating registers for said instructions using said obtained interference graph.

9. The register allocation method according to claim 8, wherein said step of constructing and analyzing comprises the steps of:
    searching for instructions, in accordance with a depth priority order, that are nodes of said DAG; and
    generating a reverse post order for the search results; and
    wherein said step of constructing said interference graph includes the steps of:
        extracting an instruction from said DAG in said obtained reverse post order, and determining whether an interference exists between a variable used by said extracted instruction and another variable; and
        constructing said interference graph by reflecting, in said interference graph, said determined interference between said variables.

10. The register allocation method according to claim 9, wherein said step of constructing and analyzing said DAG comprises:
    calculating, for each of said instructions that serve as the nodes of said DAG, the degree of freedom permitted for changing an execution start time, and the earliest execution start time: and wherein said step of constructing said interference graph includes the step of:
    employing said degree of freedom and said earliest execution start time to determine an execution start time for each of said instructions that are extracted from said DAG in said reverse post order; and
    determining interference between variables used for said instructions, based on said obtained execution start time for said instructions.

11. The register allocation method according to claim 10, wherein said step of determining said execution start time for each instruction comprises:
    employing said degree of freedom and said earliest execution start time for said instruction to determine, when said execution start time for said instruction is delayed within a range wherein the overall program execution time is not extended and when the number of interferences between a function used for said instruction and another function is reduced, the execution start time for said instruction, the time whereat the number of interferences is minimized.

12. The register allocation method according to claim 8, wherein at said step of performing register allocation, the same register is allocated to variables defined on the same path in said DAG.

13. A program transmission apparatus comprising:
    storage means for storing a program for permitting a computer to perform
    a process for constructing and analyzing a directed acyclic graph DAG for each of said instructions based on said program,
    a process for employing as a reference the longest non-parallel instruction queue in said DAG, and constructing an interference graph that assumes that an interference has occurred among variables used by said multiple instructions, based on the DAG analysis results, when said instruction queue is extended, unless predetermined multiple instructions are executed in parallel, wherein said interference graph constructing determines a phase arrangement order for nodes of said DAG, so that said execution interval for said program is minimized, and when the intervals are overlapped where the variables among said instructions in said phase arrangement order are present, said interference between said variables is reflected in said interference graph, and
    a process for allocating registers for said instructions using said obtained interference graph; and
    transmission means for reading said program from said storage means and transmitting said program.

* * * * *